Sept. 22, 1953 L. PRESS 2,653,072
RETAINER BEARING DRAWER
Filed June 1, 1950 2 Sheets-Sheet 1
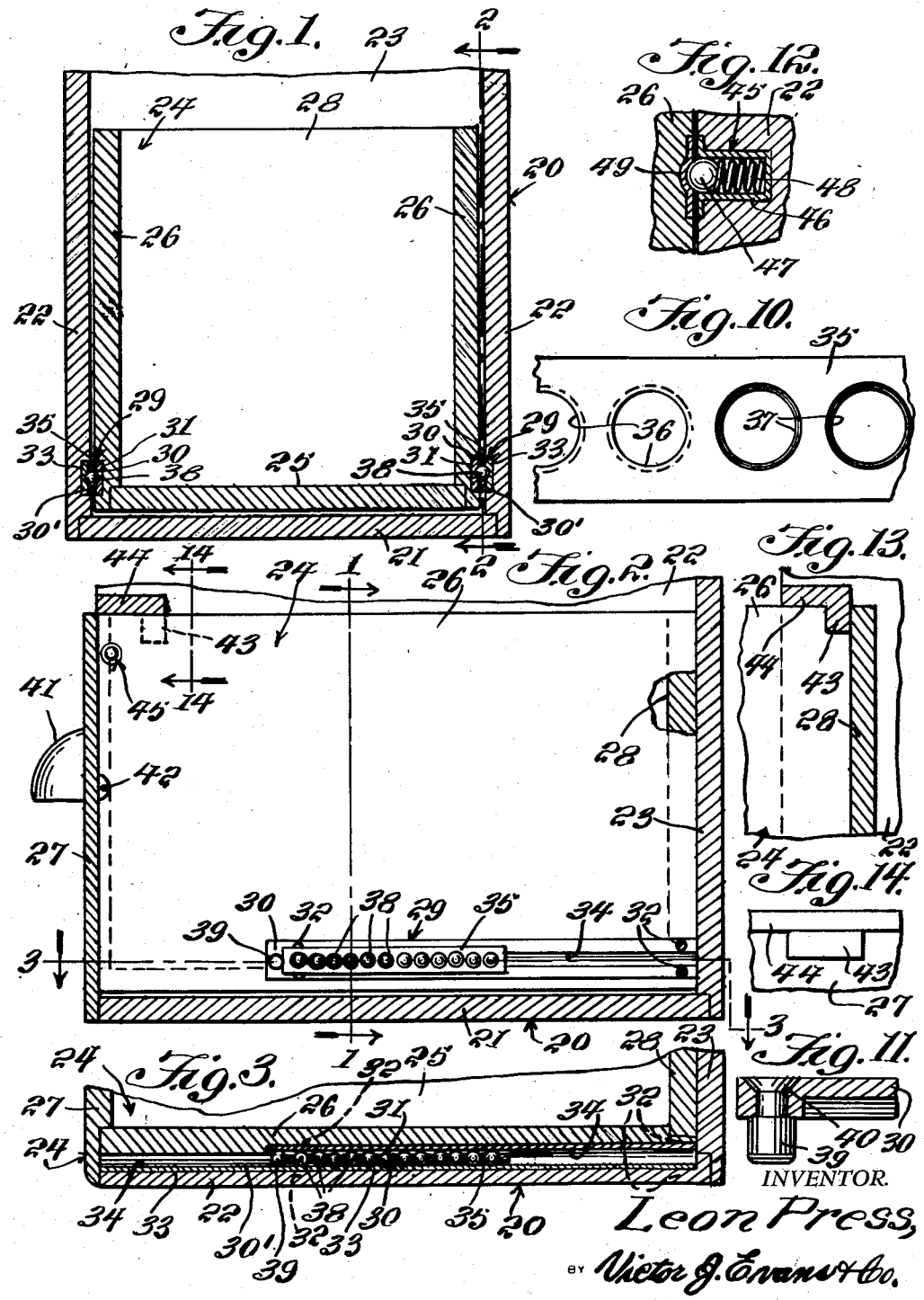
INVENTOR.
Leon Press Sept. 22, 1953         L. PRESS         2,653,072
RETAINER BEARING DRAWER
Filed June 1, 1950         2 Sheets-Sheet 2
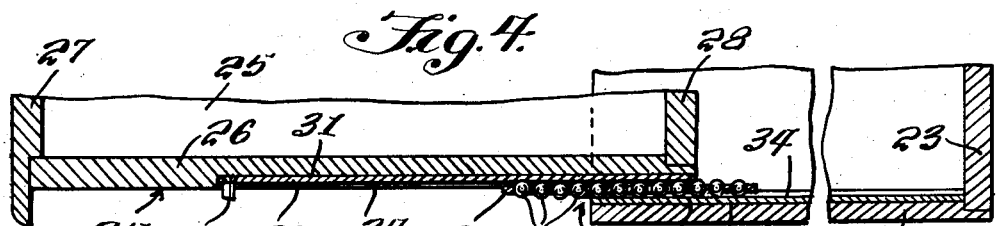
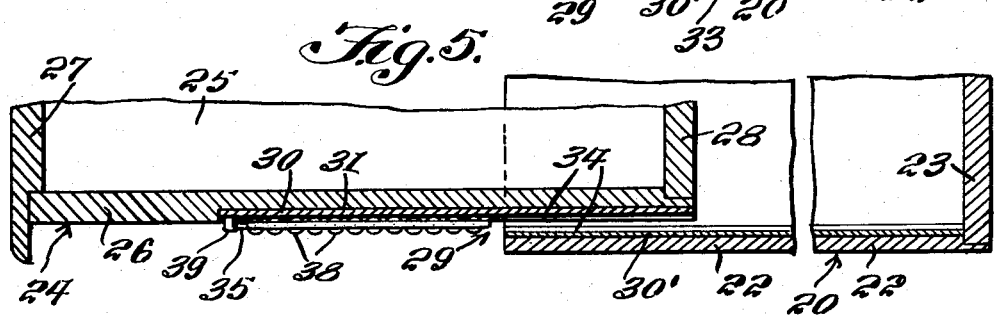
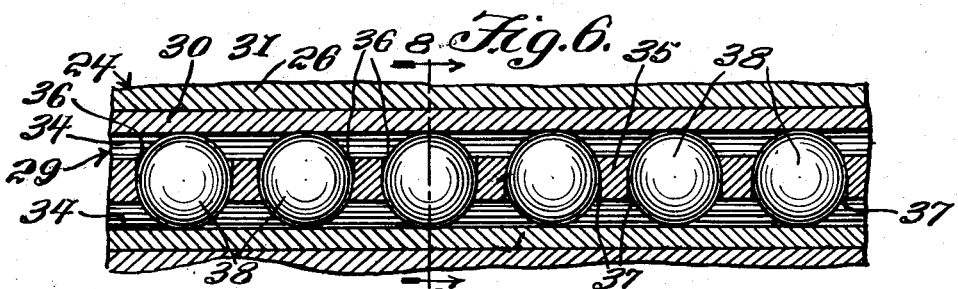
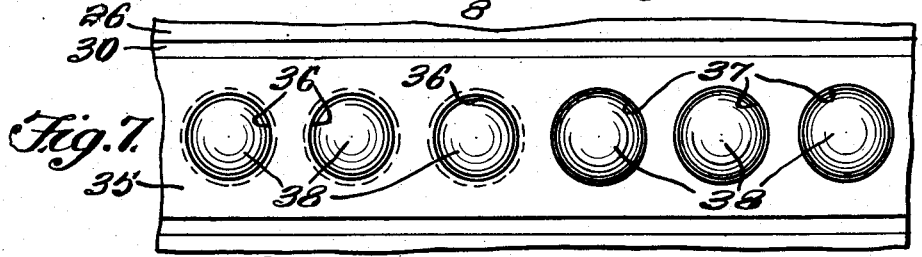
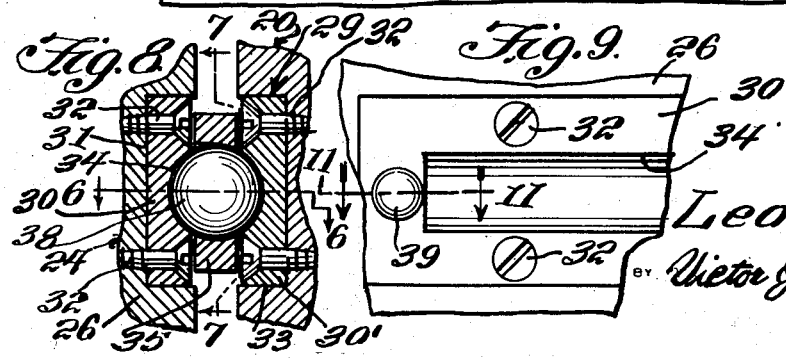
INVENTOR.
Leon Press,
BY Victor J. Evans & Co.
ATTORNEYS Patented Sept. 22, 1953

2,653,072

UNITED STATES PATENT OFFICE 2,653,072

RETAINER BEARING DRAWER

Leon Press, Baltimore, Md.

Application June 1, 1950, Serial 165,409

1 Claim. (Cl. 312—339)

This invention relates to furniture, and more particularly to a sliding drawer cabinet assembly.

The object of the invention is to provide a sliding drawer cabinet construction, whereby the drawers can be opened and closed with ease, the construction of the present including a plurality of ball bearings which are arranged so that the drawer will not sag, bind or jam in the cabinet or housing.

Another object of the invention is to provide a ball bearing assembly which is adapted to be positioned between sliding drawers and the corresponding parts of a cabinet, whereby the drawers will be supported and prevented from moving out of place, the ball bearing assembly being easily installed in the cabinet which may be a filing cabinet, desk, linen closet or any other article of furniture which utilizes sliding drawers.

A further object of the invention is to provide a drawer assembly which is extremely simple and inexpensive to manufacture.

Other objects and advantages will be apparent during the course of the following description.

In the accompanying drawings forming a part of this application, and in which like numerals are used to designate like parts throughout the same:

Figure 1 is a sectional view taken on the line 1—1 of Figure 2;

Figure 2 is a sectional view taken on the line 2—2 of Figure 1;

Figure 3 is a sectional view taken on the line 3—3 of Figure 2;

Figure 4 is a view similar to Figure 3, but with the drawers shown in open position;

Figure 5 is a horizontal sectional view taken through the drawer and housing and illustrating the method of placing the ball bearing carriage in position between the drawer and housing;

Figure 6 is a sectional view taken on the line 6—6 of Figure 8;

Figure 7 is a sectional view taken on the line 7—7 of Figure 8;

Figure 8 is a sectional view taken on the line 8—8 of Figure 6;

Figure 9 is a fragmentary side elevational view of the drawer;

Figure 10 is a fragmentary side elevational view of the carriage with the ball bearings removed;

Figure 11 is a sectional view taken on the line 11—11 of Figure 9;

Figure 12 is a fragmentary view illustrating a spring pressed keeper for preventing accidental opening of the drawer;

Figure 13 is a fragmentary vertical sectional view showing a stop member for preventing the drawer from being pulled all the way out of the housing;

Figure 14 is a sectional view taken on the line 14—14 of Figure 2.

Referring in detail to the drawings, the numeral 20 designates a portion of a housing of a cabinet, the housing 20 including a horizontally disposed bottom wall 21, spaced, parallel, vertically disposed side walls 22, and a rear wall 23. This housing 20 may be part of any article of furniture, such as a filing cabinet, linen closet, desk, or work bench, and a drawer 24 is slidably arranged in the housing 20. The drawer 24 is adapted to contain any desired articles, and it is to be understood that any number of the drawers 24 can be provided according to the shape and use of the article of furniture.

The present invention is directed to a mounting for the sliding drawer 24, whereby sagging, jamming and the like between the drawer 24 and the housing 20 will be prevented. The mounting of the present invention will enable the drawer 24 to be easily opened and closed, so that there will be no sticking between the drawer and the corresponding parts of the housing.

The drawer 24 has its top open, whereby articles can be placed in the drawer or removed therefrom, and the drawer 24 includes a horizontally disposed base or bottom member 25, and projecting upwardly from the base 25 and secured thereto is a pair of spaced, parallel, vertically disposed side members 26. A vertically disposed front member 27 extends between the forward ends of the side members 26 and is secured thereto, while arranged in spaced parallel relation with respect to the front member 27 is a back member 28.

Each of the drawers 24 is provided with a pair of ball bearing assemblies 29, Figure 1, there being one of the ball bearing assemblies 29 arranged between each of the side members 26 of the drawer and the corresponding side wall 22 of the housing. Since each of the ball bearing assemblies 29 has the same construction, only one will be described in detail.

Each ball bearing assembly 29 includes a pair of rectangular plates 30, 30'. One of the guide plates 30 is positioned in a recess 31 that extends longitudinally in the side member 26, and the guide plate 30 is secured to the side member 26 by suitable securing elements, such as screws 32. A longer guide plate 30' is arranged in a longitudinally extending recess 33, the recess 33 being formed in the side wall 22 of the housing 20. Suitable screws 32 are used for securing the guide plate 30' to the side wall 22. It will be noted that the pair of guide plates are arranged in spaced, parallel opposed relation with respect to each other. Also, each of the guide plates 30 and 30' is provided with a longitudinally extending, arcuate groove 34 for a purpose to be later described.

Interposed between the pair of guide plates 30, 30' is a ball bearing retaining member or carriage 35. The carriage 35 is rectangular in shape. The carriage 35 is provided with a first set or plurality of spaced holes or sockets 36 and the carriage 35 is also provided with a second set of spaced holes or sockets 37. A ball bearing 38 is positioned in each of the sockets 36 and 37. The sockets 36 are so constructed that the ball bearings 38 are all adapted to be inserted from the side of the carriage facing the drawer, while the other set of sockets 37 are so tapered or constructed that the ball bearings 38 for the sockets 37 must be inserted from the side of the carriage facing the housing side wall. All of the ball bearings 38 are centered along the same axis in the carriage 35, and the ball bearings 38 each rotatably engage the complemental, arcuate grooves 34 in the pair of guide plates 30, 30'. Thus, it will be seen that the drawer 24 can be readily opened and closed or slid in the housing 20 without any attendant jamming or sticking of the drawer. When the drawer 24 is in its closed position, it is in the position shown in Figures 2 and 3, and when the drawer 24 is pulled open, as when the user is to remove or replace articles, the drawer is in the position shown in Figure 4. It will be noted that as the drawer 24 is pulled to its open position, as shown in Figure 4, the carriage 35 containing the ball bearings 38 therein will be partially withdrawn, but due to the fact that the set of sockets 36 taper, as previously described, the ball bearings 36 positioned in the socket 36 will be prevented from falling out of the carriage 35, even though the carriage 35 moves part of the way out of the housing when the drawer is opened.

Referring to Figure 5 of the drawings, there is shown the method for positioning the carriage 35 between the drawer 24 and the side wall 22 of the housing 20. A pin 39 is secured to the front end of the guide plate 30 which is secured to the side member 26 of the drawer 24. The pin 39 is secured to this guide plate 30 by a suitable securing element, such as a screw 40, Figure 11. Thus, to assemble the ball bearing mechanism 29, the drawer 24 is pulled out sufficiently, as shown in Figure 5. Then, the carriage 35 is seated or positioned adjacent to the guide plate 30 which is attached to the side member 26. Then, when the drawer 24 is pushed inwardly into the housing 20, the pin 39 will contact or engage the outer end of the carriage 35 to thereby force or push the carriage 35 inwardly and into the housing 20, as the drawer 24 is pushed inwardly. Finally, when the drawer 24 is pushed or moved all the way into its closed position in the housing 20, the carriage 35 will be in the position shown in Figures 2 and 3, so that subsequent sliding movement of the drawer 24 can be accomplished with ease and without any jamming. Each time the drawer 24 is pulled open, the carriage 35 will move outwardly a short distance to the position shown in Figure 4, due to the rotation of the ball bearing members 38. However, since the only ball bearings 38 which will be exposed are those that are seated in the sockets 36, none of the ball bearings 38 will accidentally drop out of the carriage 35, since the ball bearings 38 in the sockets 36 can only be removed from the carriage 35 from the opposite side thereof.

A handle 41, Figure 2, is secured to the outer surface of the front member 27 of the drawer 24 by suitable securing elements, such as screws 42. Thus, the user merely grips the handle 41 to open and close the drawer as desired.

A means is provided for limiting the outward movement of the drawer 24. In other words, this means prevents the drawer 24 from being accidentally pulled entirely out of the housing 20. This means comprises a stop member 43, Figures 2, 13 and 14, and the stop member 43 is formed integrally with or secured to the bottom of a horizontally disposed strip 44. The strip 44 is secured to the housing 20. Thus, when the drawer 24 is pulled too far out, the stop member 43 will abut or engage the back member 28 of the drawer 24 so as to prevent the drawer 24 from being pulled entirely out of the housing.

A means is provided for preventing the drawer 24 from being accidentally opened, and this means is designated generally by the numeral 45, Figures 2 and 12. This means is conventional and includes a casing 46 which is seated in a suitable recess in the housing 20, and a ball 47 is normally urged out of the casing 46 by a spring 48. The ball 47 is urged into the arcuate intermediate portion of a plate 49, the plate 49 being secured to the front end of the drawer 24. Thus, the normal seating of the ball 47 in the arcuate portion of the plate 49 will be sufficient to insure that the drawer 24 will not accidentally open, but when the user pulls the handle 41, the plate 49 can be reasily separated or moved out of engagement with the ball 47 so as to permit the drawer to be pulled to its open position.

From the foregoing, it is apparent that an assembly has been provided for insuring that a drawer, such as the drawer 24, can be opened and closed without any jamming or sticking of the drawer. To insert the carriage 35 in its proper place, the drawer 24 is pulled open to the position shown in Figure 5, and the carriage 35 is placed against the plate 30. Then, when the drawer 24 is moved inwardly, the pin 39 will move the carriage 35 inwardly, so that the carriage 35 which carries the ball bearings 38 will be in its proper position. The keeper assembly 45 maintains the drawer 24 in its proper closed position until the user desires to remove or replace articles from or in the drawer 24. To open the drawer 24, the user merely grips the handle 41 and as the drawer 24 is pulled open, the ball bearings 38 engage the arcuate grooves 34 in the guide plates so as to insure a smooth sliding movement of the drawer. The carriage 35 moves a short distance due to this ball bearing arrangement, but the carriage 35 only moves the distance indicated in Figure 4, and since the set of sockets 36 are tapered toward the side member 26, the ball bearings 38 in the sockets 36 will not accidentally fall from the carriage 35.

The pin 39 only engages the carriage 35 when the carriage is being initially positioned in the drawer, or after the carriage is being replaced. Thus, each time the drawer is closed, the bearings will roll to the same position, so that the only purpose of the pin 39 is to put the bearings in position at assembly or repair, as when the carriage and bearings have been removed. When the drawer is closed, pin 39 automatically comes to rest at the end of the carriage, but does not move or force the carriage into position.

It will be noted that one of the assemblies 29 is arranged on each side of the drawer 24, and the assembly of the present invention can be used to prevent drawers from binding, sagging or sticking, such drawers forming part of any furniture, such as desks, tool benches, linen drawers, or any other drawer used in wood furniture, and the like.

I claim:

In combination, a housing, a drawer slidably mounted in said housing, a first pair of guides secured to opposite sides of the drawer and a second pair of guides secured to opposite sides of the housing, each of said guides being provided with a longitudinally extending groove, bearing assemblies positioned on opposite sides of said drawer in said grooves, each of said assemblies comprising a flat bar like carriage provided with front and rear sets of sockets, and a ball bearing positioned in each of said sockets, said front set of sockets tapering from the side of the carriage nearest the adjacent side wall of the drawer to the side of the carriage adjacent the housing side wall so that the ball bearings may be inserted in the front set of sockets in the side of the carriage adjacent the side wall of the drawer, said rear set of sockets tapering from the side of the carriage nearest the adjacent housing side wall to the side of the carriage adjacent the side wall of the drawer so that the ball bearings may be inserted in the rear set of sockets in the side of the carriage adjacent the housing side wall, the rearmost ball bearings in the rear set of sockets being positioned rearwardly of the rear edge of the drawer and the foremost ball bearings in the front set of sockets being positioned forwardly of the front edge of the housing when the drawer is fully open.

LEON PRESS.

References Cited in the file of this patent

UNITED STATES PATENTS

| Number | Name | Date |
| --- | --- | --- |
| 1,002,902 | Cossey | Sept. 12, 1911 |
| 1,005,055 | Miller | Oct. 3, 1911 |
| 1,037,542 | Rooney | Sept. 3, 1912 |
| 1,106,992 | Thomas | Aug. 11, 1914 |
| 2,320,276 | Gussock | May 25, 1943 |